US012246365B2

(12) United States Patent
Rimnac et al.

(10) Patent No.: US 12,246,365 B2
(45) Date of Patent: Mar. 11, 2025

(54) COMBINED CASTING AND ROLLING INSTALLATION AND METHOD FOR OPERATING THE COMBINED CASTING AND ROLLING INSTALLATION

(71) Applicant: Primetals Technologies Austria GmbH, Linz (AT)

(72) Inventors: Axel Rimnac, Linz (AT); Roman Winkler, Altenberg (AT)

(73) Assignee: Primetals Technologies Austria GmbH, Linz (AT)

( * ) Notice: Subject to any disclaimer, the term of this patent is extended or adjusted under 35 U.S.C. 154(b) by 0 days.

(21) Appl. No.: 17/479,209

(22) Filed: Sep. 20, 2021

(65) Prior Publication Data
US 2022/0088654 A1 Mar. 24, 2022

(30) Foreign Application Priority Data
Sep. 24, 2020 (EP) .................................... 20198074

(51) Int. Cl.
*B21B 1/46* (2006.01)
*B22D 11/16* (2006.01)
(Continued)

(52) U.S. Cl.
CPC .............. *B21B 1/463* (2013.01); *B22D 11/16* (2013.01); *C21D 1/18* (2013.01); *C21D 8/0226* (2013.01);
(Continued)

(58) Field of Classification Search
CPC .. B21B 1/46–466; B22D 11/16; B22D 11/163
See application file for complete search history.

(56) References Cited

U.S. PATENT DOCUMENTS

| 4,994,118 A | 2/1991 | Pircher et al. |
| 6,280,542 B1 | 8/2001 | Cornelissen et al. |

(Continued)

FOREIGN PATENT DOCUMENTS

| CN | 102056690 A | 5/2011 |
| CN | 109402446 A | 3/2019 |

(Continued)

OTHER PUBLICATIONS

Machine Translation of Chen (CN 209334440 U, published Sep. 3, 2019, cited in IDS filed Sep. 21, 2023). (Year: 2019).*
(Continued)

*Primary Examiner* — Kevin E Yoon
*Assistant Examiner* — Jacky Yuen
(74) *Attorney, Agent, or Firm* — Liang & Hennessey LLP; Brian Hennessey

(57) ABSTRACT

A combined casting and rolling installation and to a method for operating the combined casting and rolling installation. The combined casting and rolling installation comprises a rough-rolling mill train, a discharging device, a first transporting device, a quenching device, and at least one severing device. The rough-rolling mill train is configured to roll a continuously cast hot billet to form a rough-rolled strip. The discharging device is downstream of the rough-rolling mill train with respect to a conveying direction of the rough-rolled strip. The severing device is between the rough-rolling mill train and the discharging device and cuts up a first sub-portion of the rough-rolled strip into a rough-rolled strip piece. The discharging device discharges the rough-rolled strip piece. The first transporting device connects the severing device to the quenching device and transports the rough-rolled strip piece to the quenching device, which is configured to quench the rough-rolled strip piece.

20 Claims, 10 Drawing Sheets

(51) Int. Cl.
*C21D 1/18* (2006.01)
*C21D 8/02* (2006.01)
*B21B 15/00* (2006.01)
*B21B 45/02* (2006.01)

(52) U.S. Cl.
CPC ......... *B21B 15/0007* (2013.01); *B21B 45/023* (2013.01)

(56) References Cited

U.S. PATENT DOCUMENTS

| | | | |
|---|---|---|---|
| 6,374,901 B1 * | 4/2002 | Frank | C21D 8/021 164/444 |
| 8,276,647 B2 | 10/2012 | Hohenbichler et al. | |
| 2002/0104597 A1 | 8/2002 | Frank et al. | |
| 2005/0155740 A1 * | 7/2005 | Arvedi | C21D 8/0226 164/452 |
| 2005/0211350 A1 | 9/2005 | Unal et al. | |
| 2008/0035301 A1 | 2/2008 | Arvedi | |
| 2008/0276679 A1 * | 11/2008 | Eckerstorfer | B21B 13/22 72/38 |
| 2010/0147484 A1 * | 6/2010 | Rosenthal | C21D 9/48 164/269 |
| 2016/0101450 A1 * | 4/2016 | Linzer | B21B 37/76 72/251 |
| 2016/0325324 A1 | 11/2016 | Merz et al. | |
| 2019/0085427 A1 | 3/2019 | Takashima et al. | |
| 2020/0061685 A1 * | 2/2020 | Seidel | B21B 1/22 |
| 2020/0086368 A1 * | 3/2020 | Vignolo | B21B 1/26 |
| 2020/0331045 A1 * | 10/2020 | Chung | B22D 11/126 |

FOREIGN PATENT DOCUMENTS

| | | |
|---|---|---|
| CN | 109433825 A | 3/2019 |
| CN | 209334440 U | 9/2019 |
| DE | 102013220657 A1 | 1/2015 |
| DE | 102013214940 A1 | 2/2015 |
| EP | 144694 A3 | 10/1987 |
| EP | 2202327 A1 | 6/2010 |
| JP | H02133101 A | 5/1990 |
| JP | H02299701 A | 12/1990 |
| JP | H0780508 A | 3/1995 |
| JP | 2000158007 A | 6/2000 |
| JP | 2005169454 A * | 6/2005 |
| RU | 2302304 C2 | 7/2007 |
| RU | 2489217 C1 | 8/2013 |
| RU | 2491140 A | 8/2013 |
| WO | 2009121678 A1 | 10/2009 |
| WO | 2014029544 A1 | 2/2014 |
| WO | 2015110648 A1 | 7/2015 |
| WO | 2018080706 A1 | 5/2018 |
| WO | WO-2019088771 A1 * | 5/2019 ............... B21B 1/46 |

OTHER PUBLICATIONS

Russian Office Action received in Russian Application No. 2021118360/05(038652) dated Nov. 30, 2021, pp. 1-23.
European Search Report received in European Application No. 20198074.5 dated Mar. 1, 2021, pp. 7.
Wei Yu et al, "Microstructure and Properties Control of Rolled Steel principle, Technology and Equipment" Oct. 31, 2016, Metallurgical Industry Press, pp. 1-9.
Ji Zesheng et al. "Heat Treatment Furnace", Harbin Engineering University Press, Apr. 2016, pp. 1-8.
Chinese Office Action received in Chinese Application No. 202111122881.0 dated Mar. 30, 2023, pp. 1-18.
Chinese Office Action received in Chinese Application No. 202111122881.0 dated Aug. 24, 2023, pp. 1-8.

* cited by examiner

COMBINED CASTING AND ROLLING INSTALLATION AND METHOD FOR OPERATING THE COMBINED CASTING AND ROLLING INSTALLATION

CROSS-REFERENCE TO RELATED APPLICATIONS

The present application claims the benefit of European Patent Application No. 20198074.5, entitled "COMBINED CASTING AND ROLLING INSTALLATION AND METHOD FOR OPERATING THE COMBINED CASTING AND ROLLING INSTALLATION", filed Sep. 24, 2020, which is incorporated by reference in its entirety.

BACKGROUND OF THE INVENTION

1. Field of the Invention

The invention relates to a combined casting and rolling installation and to a method for operating the combined casting and rolling installation.

2. Description of the Related Art

WO 2009/121678 A1 discloses a combined casting and rolling installation for producing a hot-rolled product, having a rough-rolling mill train, a discharging apparatus and at least one severing device.

SUMMARY OF THE INVENTION

It is the object of the invention to provide an improved combined casting and rolling installation and an improved method for operating the combined casting and rolling installation.

This object is achieved by means of a combined casting and rolling installation and a method for operating the combined casting and rolling installation. Advantageous embodiments are specified in the dependent claims.

It has been recognized that an improved combined casting and rolling installation can be provided in that the combined casting and rolling installation comprises a rough-rolling mill train, a discharging device, a quenching device, a first transporting device and at least one severing device. The combined casting and rolling installation is configured for the production of a hot-rolled product from a continuously cast hot billet. The rough-rolling mill train is configured to roll a continuously cast hot billet to form a rough-rolled strip. The rough-rolling mill train is positioned upstream of the discharging device with respect to a conveying direction of the rough-rolled strip and a severing device is arranged between the rough-rolling mill train and the discharging device. The severing device is configured to cut up a first sub-portion of the rough-rolled strip into a rough-rolled strip piece. The first transporting device connects the installation portion arranged directly downstream of the severing device to the quenching device and is configured to transport the rough-rolled strip piece to the quenching device. The quenching device is configured to quench the rough-rolled strip piece. The discharging device is configured to discharge the rough-rolled strip piece.

This refinement of the combined casting and rolling installation has the advantage that the rough-rolled strip piece can be further processed after the quenching, and it is possible to dispense with scrapping of the first sub-portion or of the rough-rolled strip piece. In particular, the rough-rolled strip piece is suitable for being used as a wear plate. As a result, the combined casting and rolling installation has a particularly high output, such that a proportion that has to be scrapped is particularly low. As a result, the first sub-portion of the rough-rolled strip, said first sub-portion having been cast for example at a first casting rate below a predefined minimum casting rate, can also be further processed.

It is particularly advantageous if the quenching device comprises a quenching tank and a lifting device, wherein the quenching tank can be filled with a cooling liquid, preferably cooling water. The lifting device adjoins the first transporting device in a conveying direction of the rough-rolled strip piece and is configured to lower the rough-rolled strip piece into the quenching tank for quenching of the rough-rolled strip piece for a predefined first time interval and to lift said rough-rolled strip piece out of the quenching tank after the first time interval has expired. As a result, the periphery of the rough-rolled strip piece can be completely quenched and hardened. In addition, a forced flow for example of cooling liquid around the rough-rolled strip piece can be ensured in the quenching device. A particularly high quenching rate is ensured as a result. Due to the fact that the rough-rolled strip piece remains in the quenching tank, a high proportion of hardening phases such as for example martensite in an outer layer of the rough-rolled strip piece is ensured.

In a further embodiment, the lifting device is configured to hold the rough-rolled strip piece outside of the cooling liquid for a predefined second time interval, wherein the lifting device is further configured to lower the rough-rolled strip piece into the quenching tank again for a third time interval after the second time interval has expired and to lift said rough-rolled strip piece out of the quenching tank again after the third time interval has expired. This refinement has the advantage that, during the second time interval, a still hot core of the rough-rolled strip piece heats the outer layer of the rough-rolled strip piece and, as a result, a recovery process and/or a heat treatment process occur/occurs in the outer layer. As a result of the further immersion of the rough-rolled strip piece in the cooling liquid, the rough-rolled strip piece is quenched again, such that after the third time interval, the rough-rolled strip piece has a particularly thick outer layer comprising tempered non-equilibrium phases such as for example martensite or bainite.

In a further embodiment, the quenching device comprises at least one quenching unit, wherein the rough-rolled strip piece can be transported through the quenching unit at a predefined rate. The quenching unit is configured to spray a cooling liquid, preferably water and/or liquid nitrogen, in a directed manner onto the rough-rolled strip piece for quenching of the rough-rolled strip piece. This refinement has the advantage that the quenching rate can be accurately adjusted. In addition, for example quenching with liquid nitrogen can achieve a particularly high quenching rate in a core of the rough-rolled strip piece, such that the formation of martensite is increased compared with the quenching with water and the rough-rolled strip piece resulting comprises a particularly high proportion of martensite.

In a further embodiment, the combined casting and rolling installation comprises a rough-rolled strip piece storage unit and a second transporting device, wherein the second transporting device is arranged at least between the rough-rolled strip piece storage unit and the quenching device. The second transporting device is configured to transport the rough-rolled strip piece from the quenching device to the rough-rolled strip piece storage unit, and the rough-rolled strip piece storage unit is configured to store the rough-rolled strip piece for at least 12 hours, preferably for at least 24 hours. This refinement has the advantage that the rough-rolled strip piece can be stored and cooled in the rough-rolled strip piece storage unit for further processing purposes.

In a further embodiment, the combined casting and rolling installation comprises a finishing rolling mill train, wherein the finishing rolling mill train is arranged downstream of the discharging device with respect to the conveying direction of the rough-rolled strip, wherein the finishing rolling mill train is arranged parallel to the quenching device, wherein a second sub-portion of the rough-rolled strip can be supplied to the finishing rolling mill train, wherein the finishing rolling mill train is configured to roll the second sub-portion into a finish-rolled strip, wherein the discharging device is configured to transfer the rough-rolled strip piece to the first transporting device, wherein the first transporting device is configured to transport the rough-rolled strip piece to the quenching device. As a result, a high quality of the finish-rolled strip can also be ensured.

In a further embodiment, the combined casting and rolling installation comprises a finishing rolling mill train, wherein the finishing rolling mill train is arranged downstream of the rough-rolling mill train with respect to the conveying direction of the rough-rolled strip, wherein a second sub-portion of the rough-rolled strip can be supplied to the finishing rolling mill train, wherein the finishing rolling mill train has a first operating state and a second operating state which differs from the first operating state, wherein the discharging device is arranged downstream of the finishing rolling mill train with respect to the conveying direction of the rough-rolled strip, wherein the finishing rolling mill train forms the first transporting device and is configured, in the first operating state, to transport the rough-rolled strip piece to the discharging device, wherein the discharging device is configured to discharge the rough-rolled strip piece, wherein the finishing rolling mill train is configured, in the second operating state, to roll the second sub-portion into a finish-rolled strip. This refinement has the advantage that the combined casting and rolling installation is constructed in an in-line manner and, as a result, the lateral installation space requirement is kept low.

In a further embodiment, the quenching device is arranged between the rough-rolling mill train and the finishing rolling mill train with respect to the conveying direction of the rough-rolled strip, wherein, in the first operating state, the finishing rolling mill train is configured to transport the quenched rough-rolled strip piece to the discharging device. This refinement has the advantage that a lateral installation space requirement in the region between the rough-rolling mill train and the finishing rolling mill train is kept low.

In a further embodiment, the quenching device is between the finishing rolling mill train and the discharging device with respect to the conveying direction of the finish-rolled strip, wherein the severing device is arranged between the rough-rolling mill train and the finishing rolling mill train, wherein, in the first operating state, the finishing rolling mill train is configured to maintain a cross section of the rough-rolled strip piece. The quenching device and a cooling device for cooling the finished strip may be configured in an integrated manner, such that the number of structural components is low.

During operation of the combined casting and rolling installation described above, a continuously cast hot billet is rolled in the rough-rolling mill train to form a rough-rolled strip. The severing device cuts up a first sub-portion of the rough-rolled strip into a rough-rolled strip piece. The discharging device discharges the rough-rolled strip piece. The first transporting device transports the rough-rolled strip piece from the severing device to the quenching device. The quenching device quenches the rough-rolled strip piece by means of the cooling liquid. As a result, the rough-rolled strip piece is hardened and comprises, if the rough-rolled strip piece comprises steel, a particularly high proportion of martensite at least in an outer layer of the rough-rolled strip piece after the quenching.

In a further embodiment, during the quenching, the rough-rolled strip piece is exposed to the cooling liquid for a predefined first time interval. Here, an outer layer of the rough-rolled strip piece is quenched during the first time interval. During the quenching, the core contains residual heat. After the rough-rolled strip piece has been quenched, the rough-rolled strip piece is stored for a second predefined time interval and the hot core heats the hardened outer layer again. After the second time interval has expired, the rough-rolled strip piece is again exposed to the cooling liquid for a third predefined time interval and quenched. The outer layer may extend from an external surface in the direction of the core for example over between 10 percent and 25 percent of a thickness of the rough-rolled strip piece.

In a further embodiment, during the first time interval, the outer layer of the rough-rolled strip piece is quenched from a first temperature of between 1050° C. and 1200° C. to a second temperature $T_2$ of 150° C. to 400° C., wherein the core of the rough-rolled strip piece heats the outer layer in the second time interval to a third temperature of between 400° C. and 600° C. In the third time interval, the outer layer is quenched to a fourth temperature of between 100° C. and 200° C. This refinement has the advantage that during the second time interval, a tempering process and/or a recovery process is effected at least in the outer layer of the rough-rolled strip piece. The double quenching achieves a particularly favorable microstructure in the rough-rolled strip piece, said microstructure advantageously corresponding to that of a thick steel strip produced on the conventional hot strip rolling mill. It is also advantageous if the quenching rate in the first and/or third time interval is between 30° C. and 60° C. per second in a core of the rough-rolled strip piece. As a result, it is possible to produce steels whose surfaces have particularly good wear resistance.

In a further embodiment, a local casting rate is ascertained over an operation of casting the hot billet from a metallic melt. The ascertained local casting rate is assigned to a rough-rolled strip position of the rough-rolled strip. The first sub-portion of the rough-rolled strip is ascertained on the basis of the local casting rate, assigned to the preliminary strip, below a predefined minimum casting rate. The first sub-portion may be for example a start-up billet. In the case of a disruption in production, for example in the case of too low a supply of metallic melt, the first sub-portion may also result from the disruption in production. This refinement has the advantage that the first sub-portion of the rough-rolled strip, said first sub-portion being unsuitable for being rolled to form the finish-rolled strip, can be further processed as a rough-rolled strip piece. The cutting-up of the first sub-portion of the rough-rolled strip has the advantage that the quenching device and the first transporting device can be kept small.

In a further embodiment, a second sub-portion of the rough-rolled strip is ascertained on the basis of the local casting rate, assigned to the preliminary strip, above the predefined minimum casting rate, wherein the second sub-portion is supplied to the finishing rolling mill train. The finishing rolling mill train is configured to finish-roll the second sub-portion to form the finish-rolled strip. This refinement has the advantage that the entire hot billet is further processed and, as a result, the combined casting and rolling installation delivers a particularly high yield.

In a particularly advantageous embodiment, the metallic melt comprises substantially steel, wherein the rough-rolling mill train is configured to roll the hot billet to a thickness of 6 mm to 45 mm. Downstream of the rough-rolling mill train, the rough-rolled strip comprises predominantly austenite having a grain size of 50 μm to 100 μm.

In a further embodiment, the rough-rolled strip piece is quenched in such a way that the rough-rolled strip piece comprises predominantly martensite, that is to say to an extent of at least 50%, in an outer layer of 10 to 25 percent of a thickness of the rough-rolled strip piece.

BRIEF DESCRIPTION OF THE DRAWINGS

The invention is explained in more detail below with reference to the figures, in which.

DETAILED DESCRIPTION

Figure 1:
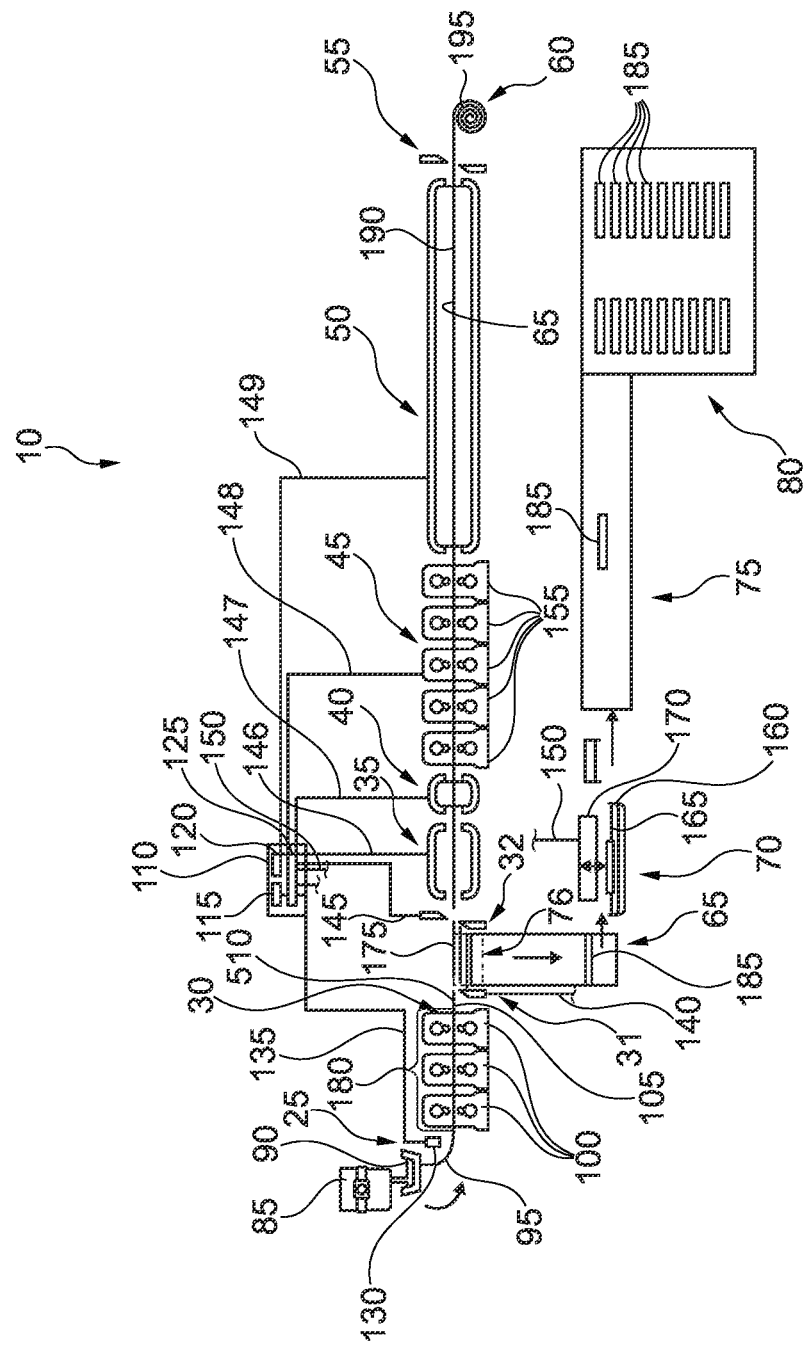
FIG. 1 shows a schematic illustration of a combined casting and rolling installation according to a first embodiment.

The combined casting and rolling installation 10 comprises for example a continuous casting installation 25, a first to third severing device 31, 32, 55, an intermediate heating system 35, a descaler 40, a finishing rolling mill train 45, a cooling device 50, a winding device 60, a first transporting device 65, a quenching device 70, a second transporting device 75, a discharging device 76 and a rough-rolled strip piece storage unit 80.

The continuous casting installation 25 is configured for example in the form of a bow-type continuous casting installation. Another configuration of the continuous casting installation 25 is also conceivable. During operation of the combined casting and rolling installation 10, the continuous casting installation 25 is filled with a metallic melt 90 by means of a ladle 85. The metallic melt 90 may be produced for example by means of a converter, for example an electric arc furnace, or in a Linz-Donawitz process. The metallic melt 90 may comprise for example steel. The temperatures specified below are based in each case on the fact that the combined casting and rolling installation 10 is fed with steel as material. The metallic melt 90 may also comprise predominantly a non-ferrous material.

In the continuous casting installation 25, the metallic melt 90 is solidified to form a hot billet 95. It is particularly advantageous here if the continuous casting installation 25 casts the hot billet 95 in a continuous strip mode (also called endless strip production). In a conveying direction of the hot billet 95, the rough-rolling mill train 30 is arranged downstream of the continuous casting installation 25 and follows directly after the continuous casting installation 25 in the embodiment.

The rough-rolling mill train 30 may comprise one or more rough-rolling stands 100 which are arranged in succession in the conveying direction of the hot billet 95. The number of rough-rolling stands 100 is essentially freely selectable and is essentially dependent on a format of the hot billet 95. The rough-rolling mill train 30 is configured to roll the hot billet 95, which is hot during supply into the rough-rolling mill train 30, to form a rough-rolled strip 105. During supply of the hot billet 95 into the rough-rolling mill train 30, the hot billet 95 has a temperature of 1100° C. to 1200° C., for example. The rough-rolling mill train 30 rolls the hot billet 95 into the rough-rolled strip 105. Upon leaving the rough-rolling mill train 30, the rough-rolled strip 105 may have a thickness d of 6 mm to 45 mm and a first temperature $T_1$ of 1050° C. to 1200° C. In the embodiment, the rough-rolled strip 105 has the thickness d of 40 mm as an example.

The first and second severing devices 31, 32 are arranged downstream of the rough-rolling mill train 30 with respect to the conveying direction of the hot billet 95 which is rolled to form the rough-rolled strip 105. In this case, the first severing device 31 may be arranged directly downstream of the rough-rolling mill train 30 between the first severing device 31 and the second severing device 32. The second severing device 32 is arranged downstream of the discharging device 76 with respect to the conveying direction of the rough-rolled strip 105. It is also possible to dispense with the second severing device 32. The first and/or second severing device(s) 31, 32 may be configured for example in the form of drum shears or in the form of pendulum shears.

The intermediate heating system 35 may be arranged between the second severing device 32 and the finishing rolling mill train 45. The intermediate heating system 35 may be configured for example in the form of an induction furnace. Another configuration of the intermediate heating system 35 would also be conceivable. The intermediate heating system 35 is arranged upstream of the finishing rolling mill train 45 and of the descaler 40 with respect to the conveying direction of the rough-rolled strip 105. The descaler 40 is arranged directly upstream of the finishing rolling mill train 45 and directly downstream of the intermediate heating system 35.

The finishing rolling mill train 45 may comprise one or more finishing rolling stands 155. By way of example, in the embodiment, provision is made for five finishing rolling stands 155 which are arranged in succession with respect to the conveying device of the rough-rolled strip 105. The finishing rolling mill train 45 is configured to roll the rough-rolled strip 105 in the conveying direction of the rough-rolled strip 105 to form a finish-rolled strip 190, for example to form a metal sheet having a final thickness of 0.5 mm to 12.5 mm upon leaving the finishing rolling mill train 45.

With respect to the conveying direction of the finish-rolled strip 190, the finishing rolling mill train 45 is adjoined by the cooling device 50. The third severing device 55 is arranged on a side, facing away from the finishing rolling mill train 45, of the cooling device 50. The third severing device 55 may be configured for example in the form of drum shears or crank shears. The winding device 60 may be arranged downstream of the third severing device 55.

The first transporting device 65 begins at the discharging device 76 and is preferably configured in the form of a first roller table. Less preferably, the first transporting device 65 could also be realized by a lifting apparatus (aerial device, for example a crane). The first transporting device 65 ends at the quenching device 70.

By way of example, in the embodiment, the quenching device 70 comprises a quenching tank 160 and a lifting device 170. The quenching tank 160 can be filled with a cooling liquid 165, for example water. In addition, an additive may be mixed with the cooling liquid 165 in order to reduce for example corrosive properties of the cooling liquid 165. The lifting device 170 can be moved between a first position and a second position. In the first position, a loading region of the lifting device 170 is arranged completely outside of the quenching tank 160. In the second position, the lifting region of the lifting device 170 is at least partially lowered in the quenching tank 160.

The second transporting device 75 is arranged on a side, facing away from the first transporting device 65, of the quenching device 70. The second transporting device 75 may be configured for example in the form of a second roller table. It is for example also possible for the second transporting device 75 to comprise a crane, a forklift or similar. The second transporting device 75 connects the quenching device 70 to the rough-rolled strip piece storage unit 80.

The combined casting and rolling installation 10 may also comprise a control unit 110. The control unit 110 comprises for example a control device 115 and a data memory 120 connected to the control device 115, and also an interface 125 connected to the control device 115. A predefined minimum casting rate may be stored in the data memory 120. A control program for controlling the combined casting and rolling installation 10 may also be stored in the data memory 120.

Furthermore, the combined casting and rolling installation 10 may comprise at least one sensor 130, wherein the sensor 130 is connected to the interface 125 by means of a first data connection 135. It is also possible at least for the first severing device 31 to be connected to the interface 125 via a second data connection 140 and the second severing device 32 to be connected to the interface 125 via a third data connection 145. The quenching device 70 may be connected to the interface 125 by means of a fourth data connection 150. It is also possible for the intermediate heating system 35, the descaler 40, the finishing rolling mill train 45 and the cooling device 50 to be connected to the interface 120 by means of an assigned fifth to eighth data connection 145, 146, 147, 148, 149. The data connection 135, 140, 145, 146, 147, 148, 149, 150 may be for example part of an industrial network. For example, the industrial network may be operated in accordance with an EtherCAT standard.

Figure 2:
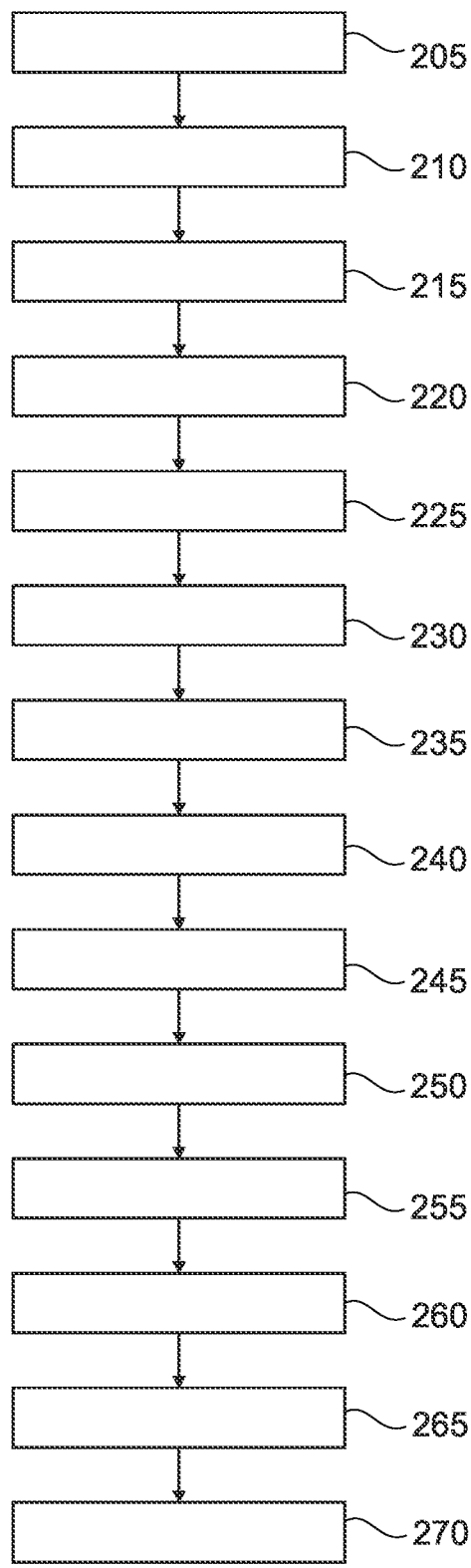
FIG. 2 shows a flow diagram of a method for operating the combined casting and rolling installation shown in FIG. 1.
Figure 3:
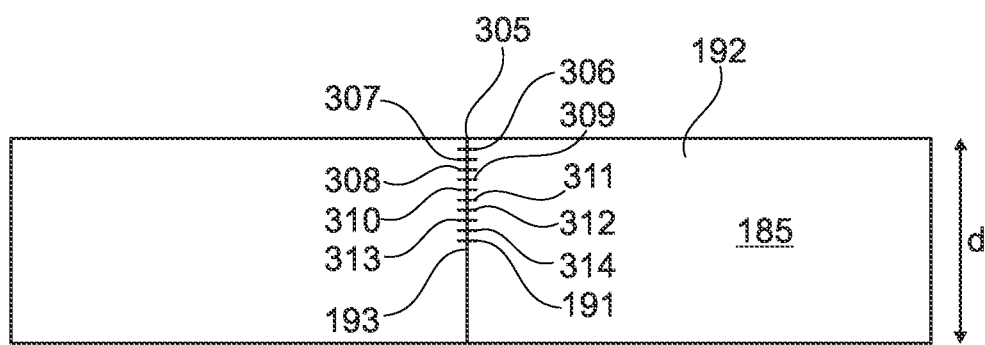
FIG. 3 shows a cross section through a rough-rolled strip piece.
Figure 4:
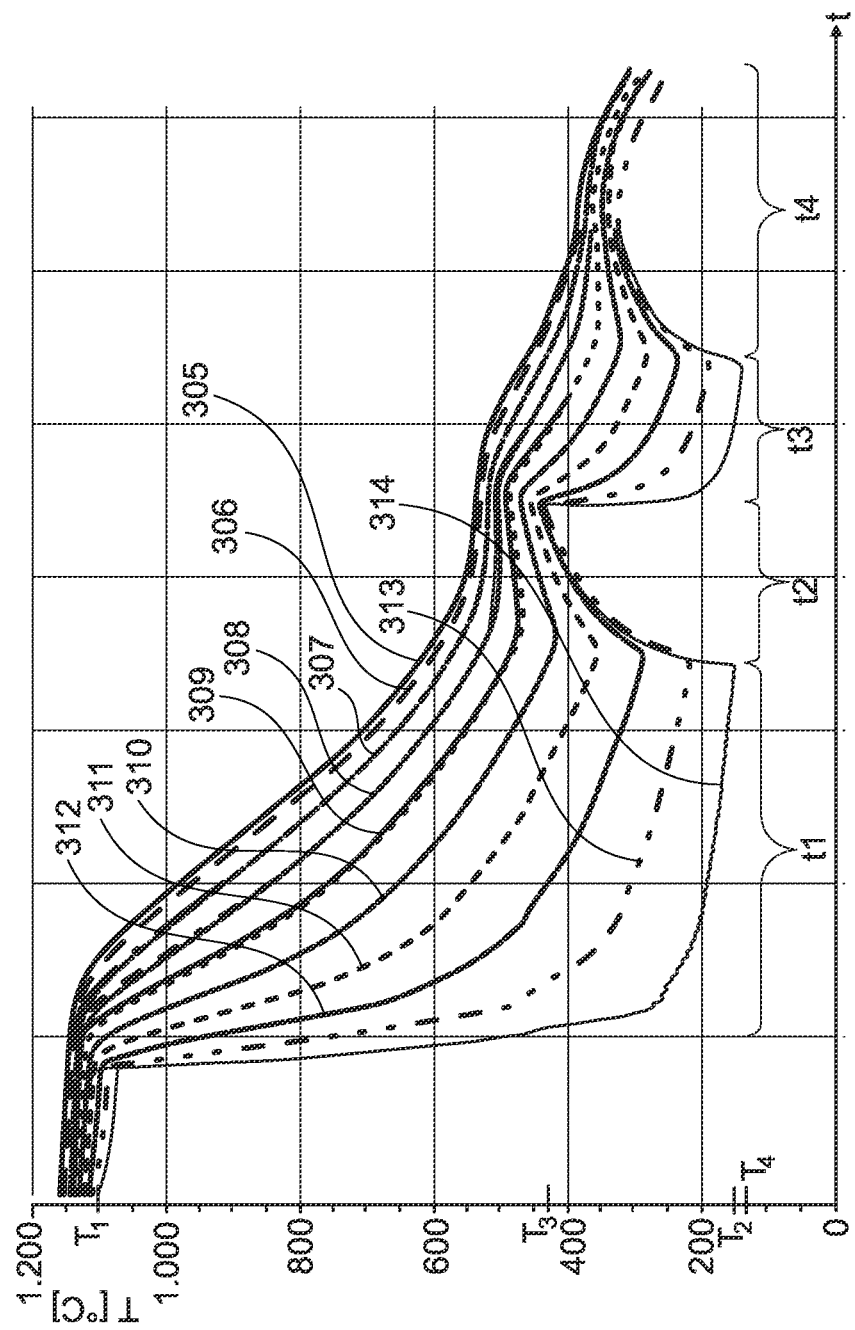
FIG. 4 shows a temperature-time graph of the rough-rolled strip piece during the method described in FIG. 2.
Figure 5:
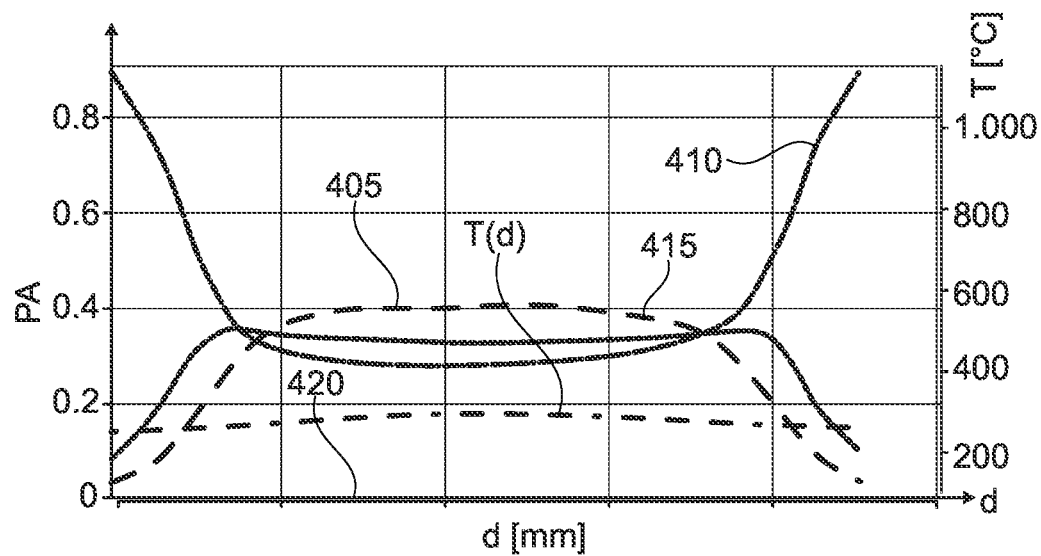
FIG. 5 shows a graph concerning a composition of the rough-rolled strip piece over a thickness of the rough-rolled strip piece in a center in a transverse direction of the rough-rolled strip piece after an eighth method step.

FIG. 2 shows a flow diagram of a method for operating the combined casting and rolling installation 10 shown in FIG. 1. FIG. 3 shows a cross section through a rough-rolled strip piece 185. FIG. 4 shows a temperature-time graph of a rough-rolled strip piece 185 during the method. FIG. 5 shows a graph concerning a composition of the rough-rolled strip piece 185 over the thickness d of the rough-rolled strip piece 185 in a center 193 in a transverse direction of the rough-rolled strip piece 185 after an eighth method step 240.

During operation of the combined casting and rolling installation 10, in a first method step 205, a mold (not illustrated in FIG. 1) of the continuous casting installation 25 is closed by means of a dummy bar head and sealed by additional sealing material. A distributor of the continuous casting installation 25 is filled with the metallic melt 90 by means of the ladle 85. In order to begin the continuous casting process, a plug is removed from a casting tube of the continuous casting installation 25. Preferably, the metallic melt 90 is for example steel, for example an X70 grade steel. The metallic melt 90 may also comprise another material.

At the beginning of the continuous casting process, the metallic melt 90 in the mold flows around the dummy bar head and solidifies by cooling on the dummy bar head. The dummy bar head is slowly drawn out of the mold of the continuous casting installation 25 in the direction of the rough-rolling mill train 30. In the conveying direction, downstream of the dummy bar head, the metallic melt 90 in the mold cools at its contact surface with respect to the mold and forms a shell of the hot billet 95. The shell encloses a still liquid core 191 and retains the liquid core 191. The hot billet 95 leaves the mold at the mold outlet at a local casting rate, which is assigned to a region of the hot billet 95. At the mold outlet, a thickness d of the hot billet 95 may for example be 120 mm. The first sub-portion of the hot billet 95, said first sub-portion adjoining the dummy bar head, may also be referred to as a start-up billet.

In the continuous casting installation 25, the hot billet 95 is cooled further on the way to the rough-rolling mill train 30, such that the hot billet 95 solidifies from the outside toward the inside. By way of example, in the embodiment, the continuous casting installation 25 is configured in the form of a bow-type continuous casting installation, such that as a result of a deflection of the hot billet 95 through substantially 90° from the vertical, the hot billet 95 is supplied so as to run substantially in the horizontal into the rough-rolling mill train 30.

In a second method step 210, the local casting rate may be ascertained for example by means of the sensor 130, wherein the sensor 130 provides a rate signal, assigned to the local casting rate, to the interface 125 via the first data connection 135. The interface 125 captures the rate signal and, for its part, provides the rate signal to the control device 115. The hot billet 95 is introduced into the rough-rolling mill train 30 at the assigned local casting rate.

As the duration of the continuous casting process increases, the plug may be opened further, such that by means of a stabilization of the continuous casting of the hot billet 95, the local casting rate is greater than at the beginning of the continuous casting process.

In the third method step 215, the dummy bar head and the hot billet 95 are guided through the rough-rolling mill train 30. The rough-rolling mill train 30 preferably reduces the thickness d of the hot billet 95 from for example 100 mm to 400 mm to 6 mm to 45 mm to form the rough-rolled strip 105.

In a fourth method step 220, the control device 115 assigns the local casting rate of the hot billet 95 to a rough-rolled strip position of the rough-rolled strip 105. On the basis of the rough-rolled strip position and the local casting rate, the control device 115 also ascertains a first sub-portion 175 of the rough-rolled strip 105, the local casting rate of which undershoots the predefined minimum casting rate, and a second sub-portion 180, the local casting rate of which exceeds the predefined minimum casting rate.

Usually, the first sub-portion 175 adjoins the dummy bar head and may also be referred to as a start-up billet. The second sub-portion 180 adjoins the first sub-portion 175 on a side facing away from the dummy bar head with respect to the conveying direction of the rough-rolled strip 105.

The first sub-portion 175 has a microstructure which, on account of the slow continuous casting process and the low local casting rate, cannot be finish-rolled. Due to the low casting rate, the first sub-portion 175 is also cooled to such an extent that it is not suitable for hot rolling. As a result of the casting of the second sub-portion 180 above the minimum casting rate, the temperature of the second sub-portion 180 on the outlet side of the rough-rolling mill train 30 is significantly higher than that of the first sub-portion 175, and hot rolling is possible as a result.

The control device 115 separates the first sub-portion 175 into at least one, usually a plurality of rough-rolled strip pieces 185. This may be necessary if, in the conveying direction of the rough-rolled strip 105, the first sub-portion 175 is longer than a distance of the first severing device 31 from the second severing device 32 or a length of the discharging device 76.

In a fifth method step 225, the control device 115 actuates the first severing device 31 via the second data connection 140 in such a way that the first sub-portion 175 is cut up into at least one or a plurality of rough-rolled strip pieces 185. The control device 115 also actuates the discharging device 76 in such way that the discharging device 76 supplies the rough-rolled strip piece 185 to the first transporting device 65, such that the rough-rolled strip piece 185 is not supplied to the intermediate heating system 35.

In a sixth method step 230, the first transporting device 65 transports the rough-rolled strip piece 185 to the quenching device 70 and supplies it to the quenching device 70. In this case, the rough-rolled strip piece 185 has a substantially identical first temperature $T_1$ over its thickness d (see FIG. 4). The severed rough-rolled strip piece 185 is transported for example to the lifting region of the lifting device 170.

In a seventh method step 235 which follows the sixth method step 230, the control device 115 controls the quenching. In this case, the still hot rough-rolled strip piece 185 is lowered into the quenching tank 160 and quenched. The rough-rolled strip piece 185 remains in the cooling liquid 165 for a predefined first time interval t1 for quenching purposes. In order to ensure particularly rapid quenching in the quenching tank 160, a forced flow of the cooling liquid 165 may additionally be effected around the rough-rolled strip piece 185. As a result, a particularly high quenching rate of at least 30° C. per second is set. The rough-rolled strip piece 185 is cooled from the outside to the inside.

FIG. 4 illustrates a first to tenth graph 305 to 314, wherein each graph 305 to 314 illustrates a temperature of the rough-rolled strip piece 185 in the center 193 of the rough-rolled strip piece 185 at a determined thickness position of the rough-rolled strip piece 185 over the course of the method. A thickness distance of the graphs 305 to 314 is for example 2 mm. Thus, for example the first graph 305 shows the temperature profile over the course of the method at a thickness of 0 mm, that is to say on an external surface of the rough-rolled strip piece 185, and the tenth graph 314 at a thickness of 20 mm.

After the predefined first time interval t1 has expired, the rough-rolled strip piece 185 is lifted completely out of the quenching tank 160. The predefined first time interval t1 is in this case selected in such a way that the core 191 has substantially a temperature of above 600° C. to 800° C. at the end of the first time interval t1.

In an eighth method step 240, the rough-rolled strip piece 185 remains outside of the quenching tank 160 for a predefined second time interval t2. During this time, the core 191 heats the outer layer 192, such that recrystallization occurs in the outer layer 192 and a proportion of martensite in the outer layer 192 is reduced as a result. In this case, austenite forms in the outer layer 192. Within the second time interval t2, the outer layer 192 is heated to a temperature of 400° C. to 600° C., in particular 400° C. to 450° C., by the heat of the core 191. An additional supply of heat to the rough-rolled strip piece 185 can be dispensed with.

After the predefined second time interval t2 has expired, in a ninth method step 245, the rough-rolled strip piece 185 is again lowered into the quenching tank 160 and quenched. The rough-rolled strip piece 185 remains in the cooling liquid 165 for a predefined third time interval t3 for quenching purposes. The third time interval t3 may be shorter than the first and/or the second time interval t1, t2. The forced flow-around may additionally be activated again, such that the quenching rate in the quenching tank 160 is particularly high.

The seventh to ninth method steps 235, 240, 245 may be repeated multiple times until the core 191 has also been cooled below a predefined temperature, for example 400° C. (see FIG. 5). After the eighth method step 240, the substantially d/4 thick outer layer 192 of the rough-rolled strip piece 185 comprises predominantly a proportion PA of martensite 410 phase with a lower proportion PA of ferrite 405 and pearlite 415 phases. In the core 191, the rough-rolled strip piece 185 comprises for example substantially the phase proportions PA ferrite 405 and pearlite 415. The proportion PA of bainite 420 phase is for example below 1%. The proportion PA of martensite 410 phase decreases from the outside toward the inside.

On conclusion of the quenching operation, the hardened rough-rolled strip piece 185 is transferred from the quenching device 70 to the second transporting device 75, wherein, in a tenth method step 250, the second transporting device 75 transports the rough-rolled strip piece 185 into the rough-rolled strip piece storage unit 80. A plurality of rough-rolled strip pieces 185 may be stacked one on top of the other in the rough-rolled strip piece storage unit 80, such that the rough-rolled strip pieces 185 lie against one another in an areal manner Core residual heat of the core 191 of each rough-rolled strip piece brings about a further heat treatment and recovery process of the outer layer 192. The rough-rolled strip pieces 185 are stored in the stack in the rough-rolled strip piece storage unit 80 for a predefined fourth time interval. After the predefined time interval has expired, the rough-rolled strip pieces stored in the stack may be removed from the stack in order to store them individually at a spacing from one another. The fourth time interval may be 10 min to 6 h.

The rough-rolled strip pieces 185 are stored in the rough-rolled strip piece storage unit 80 for at least 12 hours, preferably 24 hours, such that the hardened rough-rolled strip piece 185 cools to ambient temperature in a fourth time interval t4. After the storage of the rough-rolled piece 185 in the rough-rolled strip piece storage unit 80, the rough-rolled strip piece 185 may be further processed, for example to form a wear plate. After storage in the rough-rolled strip piece storage unit 80, the rough-rolled strip piece 185 may subsequently be correspondingly cut to length and customized.

After the first sub-portion 175 has been separated out by means of the cutting-up into the rough-rolled strip piece 185 upstream of the intermediate heating system 35, in an eleventh method step 255, the second sub-portion 180 which follows the first sub-portion 175 and the local casting rate of which is higher than the predefined minimum casting rate is guided through the first and second severing devices 31, 32 and supplied to the intermediate heating system 35. The second sub-portion 180 is supplied continuously to the intermediate heating system 35 in the eleventh method step 255. The intermediate heating system 35 heats the second sub-portion 180 of the rough-rolled strip 105 from approximately 900° C. to a predefined finishing rolling temperature of 1100° C. to 1200° C. Scale can be removed from a surface of the second sub-portion 180 in the descaler 40 connected downstream of the intermediate heating system 35. For example, the scale may be washed off. The finishing rolling mill train 45 rolls, by means of the finishing rolling stands 155, the second sub-portion 180 from for example 6 to 45 mm to form a finish-rolled strip 190 which has for example a thickness of 0.5 mm to 12.5 mm upon leaving the finishing rolling mill train 45.

In a twelfth method step 260 which follows the eleventh method step 255, after leaving the finishing rolling mill train 45, the finish-rolled strip 190 is guided through the cooling device 50. The cooling device 50 cools the finish-rolled strip 190 from a temperature of approximately 800° C. to 950° C. to a temperature of below 170° C. at a cooling rate of more than 10° C. per second. The finish-rolled strip 190 is connected to the second sub-portion 180 of the rough-rolled strip 105 and to the hot billet 95.

In a thirteenth method step 265, at the end of the combined casting and rolling installation 10, the winding device 60 winds up the finish-rolled strip 190 to form a coil 195. The winding-up to form the coil 195 may be effected on a reel or a mandrel. A mandrel-less winding-up operation is also conceivable.

When the coil 195 has been completely wound, in a fourteenth method step 270, the third severing device 55 severs the wound-up finish-rolled strip 190 on the coil 195 from the finish-rolled strip 190 running through the cooling device 50. The wound-up finish-rolled strip 190 on the coil 195 may be transported away to a finished-product storage unit (not illustrated) and cooled further to ambient temperature there.

The finishing rolling mill train 45 may roll the second sub-portion 180 of the rough-rolled strip 105 to form the finish-rolled strip 190 in parallel with the quenching device 70. It is also possible for the finishing rolling mill train 45 to be idled for a short period, but an operating temperature is maintained in this state of the finishing rolling mill train 45 so that after the rough-rolled strip pieces 185 have been separated out, it is possible to begin with the rolling of the second sub-portion 180 by means of the finishing rolling mill train 45.

Figure 6:
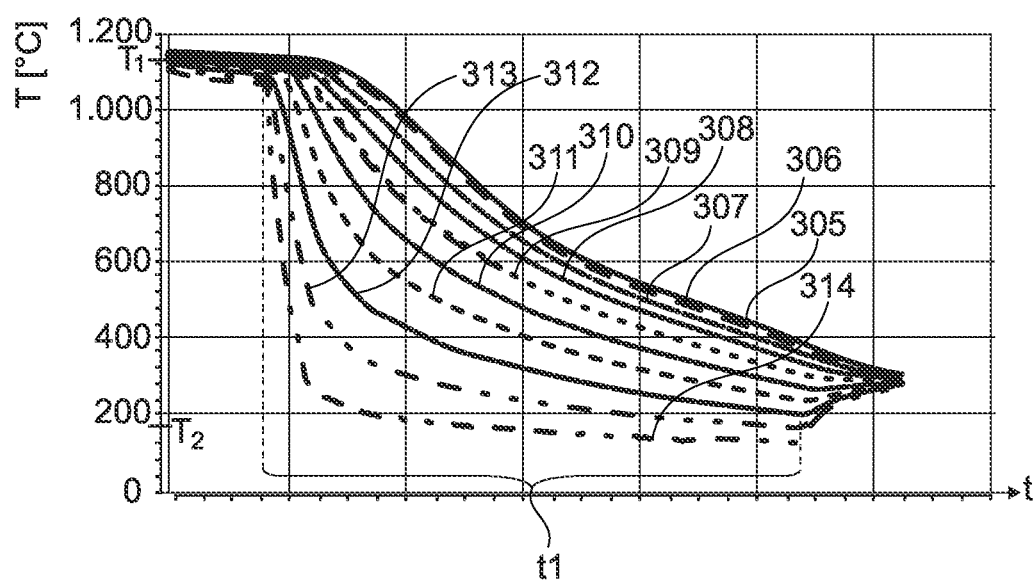
FIG. 6 shows a temperature-time graph of the rough-rolled strip piece during a development of the method described in FIG. 2.
Figure 7:
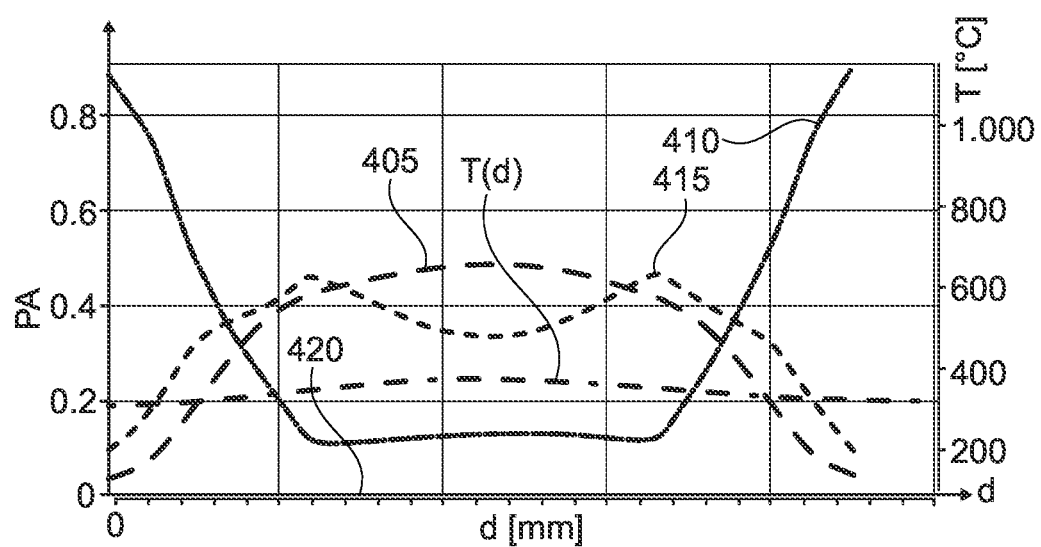
FIG. 7 shows a graph concerning a composition of the rough-rolled strip piece over the thickness of the rough-rolled strip piece in the center in the transverse direction of the rough-rolled strip piece after a sixth method step with complete full hardening of the rough-rolled strip piece.

FIG. 6 shows a temperature-time graph of the rough-rolled strip piece 185 during a development of the method described in FIG. 2. FIG. 7 shows a graph concerning a composition of the rough-rolled strip piece 185 over the thickness d of the rough-rolled strip piece 185 in the center 193 in the transverse direction of the rough-rolled strip piece 185 after the ninth method step 245 with complete full hardening of the rough-rolled strip piece 185.

In a development of the method described in FIG. 2, the eighth and ninth method steps 240, 245 are dispensed with, and in the seventh method step 230 the rough-rolled strip piece 185 remains in the quenching tank 160 until the rough-rolled strip piece 185 has been fully hardened and has been cooled in the core 191 to for example below 200° C. (see FIG. 6). As a result, over the thickness d, the rough-rolled strip piece 185 (see FIG. 7) has a composition other than the composition of the phase proportions PA shown in FIG. 5. The modification has the advantage that the method can be controlled in a particularly simple manner. The eighth and ninth method steps 240, 245 have the advantage that composition peaks of the phase proportions PA in the rough-rolled strip piece 185 are avoided and the phase proportions PA are distributed more homogeneously than shown in FIG. 7.

Figure 8:
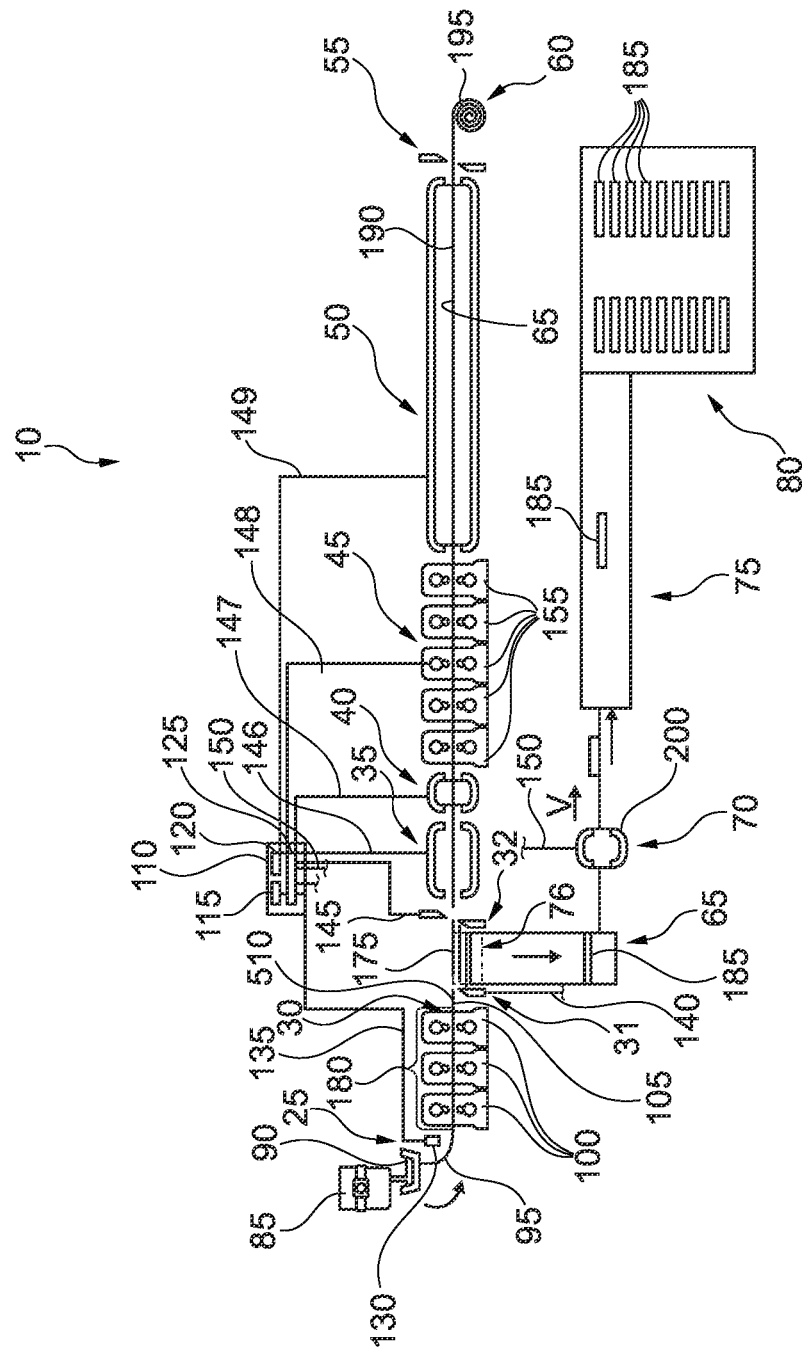
FIGS. 8 to 11 each show a schematic illustration of a combined casting and rolling installation according to a second to fifth embodiment.

FIG. 8 shows a schematic illustration of a combined casting and rolling installation 10 according to a second embodiment.

The combined casting and rolling installation 10 is configured to be substantially identical to the combined casting and rolling installation 10 shown in FIG. 1. Only the differences between the combined casting and rolling installation 10 according to the second embodiment shown in FIG. 8 and the first embodiment shown in FIG. 1 are discussed below. By contrast thereto, the quenching device 70 comprises a quenching unit 200 instead of the quenching tank 160 and the lifting device 170, wherein the quenching unit 200 is arranged between the first transporting device 65 and the second transporting device 75.

The combined casting and rolling installation 10 shown in FIG. 8 may be operated substantially by the method described in FIG. 3. Only the differences between the method for operating the combined casting and rolling installation 10 shown in FIG. 8 and the method described in FIG. 2 are discussed below.

During the seventh method step 235 and the ninth method step 245, for quenching of the rough-rolled strip piece 185, the cooling liquid 165 is sprayed in the quenching unit 200 onto the rough-rolled strip piece 185, and the rough-rolled strip piece 185 is guided at a predefined rate v, for example 1.5 m/s, through the quenching unit 200 and quenched in the process. The cooling liquid 165 may comprise water. Alternatively, it is also possible for liquid nitrogen as cooling liquid 165 to be sprayed in the quenching unit 200 onto the rough-rolled strip piece 185. The rough-rolled strip piece 185 is guided at the predefined rate v through the quenching unit 200 from the first transporting device 65 in the direction of the second transporting device 75. The cooling liquid 165 cools the rough-rolled strip piece 185 within the first time interval t1. In the second time interval t2, in the eighth method step 240, the rough-rolled strip piece 185 may remain at the beginning of the second transporting device 75. In the second time interval t2, the core 191 of the rough-rolled strip piece 185 heats the outer layer 192.

After the predefined second time interval t2 has expired, in the ninth method step 245, the rough-rolled strip piece 185 is again guided through the quenching unit 200 for example from the second transporting device 75 in the direction of the first transporting device 65. In this case, the quenching unit 200 once again sprays cooling liquid 165 onto the already quenched rough-rolled strip piece 185, the outer layer 192 of which has been reheated, and the rough-rolled strip piece 185 is quenched again. In the embodiment, the seventh to ninth method steps 230 to 240 are repeated until the core 191 of the rough-rolled strip piece 185 has been cooled below a temperature of 400° C. to 450° C. The rough-rolled strip piece 185 is then transported from the quenching unit 200 to the rough-rolled strip piece storage unit 80 via the second transporting device 75.

The use of the quenching unit 200 for quenching the rough-rolled strip piece 185 has the advantage that the cooling liquid 165 having a particularly low temperature, in particular even liquid nitrogen, can be sprayed onto the rough-rolled strip piece 185, such that a particularly high quenching rate of the rough-rolled strip piece 185 can be ensured.

Figure 9:
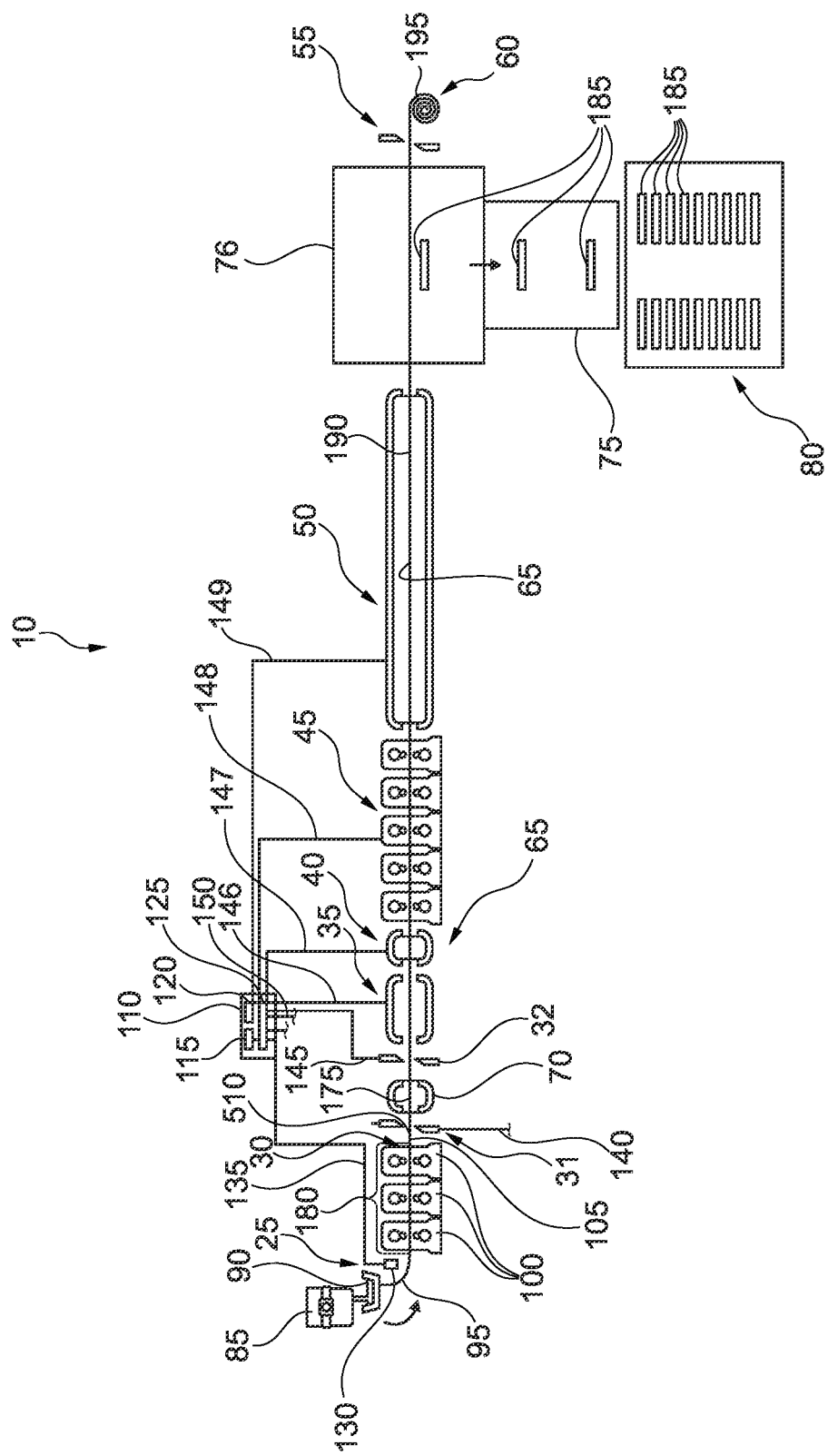

FIG. 9 shows a schematic illustration of a combined casting and rolling installation 10 according to a third embodiment.

The combined casting and rolling installation 10 is configured to be substantially identical to the combined casting and rolling installation 10 shown in FIG. 1. Only the differences between the combined casting and rolling installation 10 according to the third embodiment shown in FIG. 9 and the first embodiment shown in FIG. 1 are discussed below.

Instead of the discharging device 76, the quenching device 70 is arranged between the first severing device 31 and the second severing device 32. By contrast to FIG. 1, the quenching device 70 comprises for example the quenching unit 200 described in FIG. 8 instead of the quenching tank 160 and the lifting device 170.

With respect to the conveying direction of the finished strip 190, the discharging device 76 is arranged downstream of the cooling section 50, and thus also of the finishing rolling mill train 45, and upstream of the third severing device 55.

The first transporting device 65 extends through the intermediate heating system 35, the descaler 40, the cooling device 50 and comprises the finishing rolling mill train 45 configured. In addition, the first transporting device 65 comprises a roller table 510 which connects the outlet side of the rough-rolling mill train 30 to the quenching device 70. In the embodiment shown in FIG. 9, the second transporting device 75 connects for example the discharging device 76 to the rough-rolled strip piece storage unit 80.

The finishing rolling mill train 45 has a first operating state and a second operating state. In the first operating state, the finishing rolling stands 155 are open and form a kind of roller table. In the second operating state, the finishing rolling mill train is connected in a rolling mode in order to roll the finish-rolled strip 190.

The combined casting and rolling installation 10 shown in FIG. 9 may be operated substantially by the method described in FIG. 2. Only the differences between the method for operating the combined casting and rolling installation 10 shown in FIG. 9 and the method described in FIG. 2 are discussed below.

Since the quenching device 70 adjoins the first severing device 31, the sixth method step 230 is integrated in the transport of the preliminary strip 105.

In the seventh method step 235, the quenching unit 200 is activated by the control device 115, such that the rough-rolled strip piece 185 is sprayed with the cooling liquid and quenched by the quenching unit 200. In order to quench the rough-rolled strip piece 185 over the entire length, the intermediate heating system 35 may be spaced apart from the quenching device 70 to such an extent that the rough-rolled strip piece 185 is outside of the intermediate heating system 35 in the seventh method step 235.

The eighth method step 240 is carried out in that the quenched rough-rolled strip piece 185 is transported through the intermediate heating system 35 in the direction of the cooling device 50 by means of the first transporting device 65. In this case, the control device 115 deactivates the descaler 40, to the effect that no descaling takes place. The intermediate heating system 35 can be activated and can assist the heat treatment process and recovery process in the outer layer 192.

In the eighth method step 240, the control device 115 actuates the finishing rolling mill train 45 in such a way that the finishing rolling mill train 45 is switched to the first operating state. The recovery and heat treatment process continues during the transport of the rough-rolled strip piece 185 through the finishing rolling mill train 45. The transport from the quenching device 70 to the cooling device 50 lasts for the second time interval t2 described in FIG. 2.

In the ninth method step 245, the control device 115 activates the cooling device 50 and the cooling device 50 quenches the rough-rolled strip piece 185 for the third time interval t3.

In the tenth method step 250, the hardened rough-rolled strip piece 185 is transported from the cooling device 50 to the discharging device 76. The discharging device 76 discharges the rough-rolled strip piece 185 and transfers it to the second transporting device 75. The second transporting device 75 transports the rough-rolled strip piece 185 to the rough-rolled strip piece storage unit 80.

In the eleventh method step 255, the control device 115 deactivates the quenching device 70 and the first severing device 31. The second sub-portion 180 of the rough-rolled strip 105 is transported in unmachined form through the first and second severing devices 31, 32 and the quenching device 70. In the eleventh method step 255, the control device 115 also activates the intermediate heating system 35 and the descaler 40, such that the second sub-portion 180 is heated by the intermediate heating system 35 and descaled by the descaler 40. In the eleventh method step 255, the control device 120 controls the finishing rolling mill train 45 in the second operating state, such that the finishing rolling mill train 45 rolls the second sub-portion 180 to form the finish-rolled strip 190.

In the twelfth method step 260, the cooling device 50 is activated and cools the finished strip 190.

In the thirteenth method step 265, the finish-rolled strip 190 is guided through the discharging device 76 to the winding device 60 and wound up on the coil 195.

Figure 10:
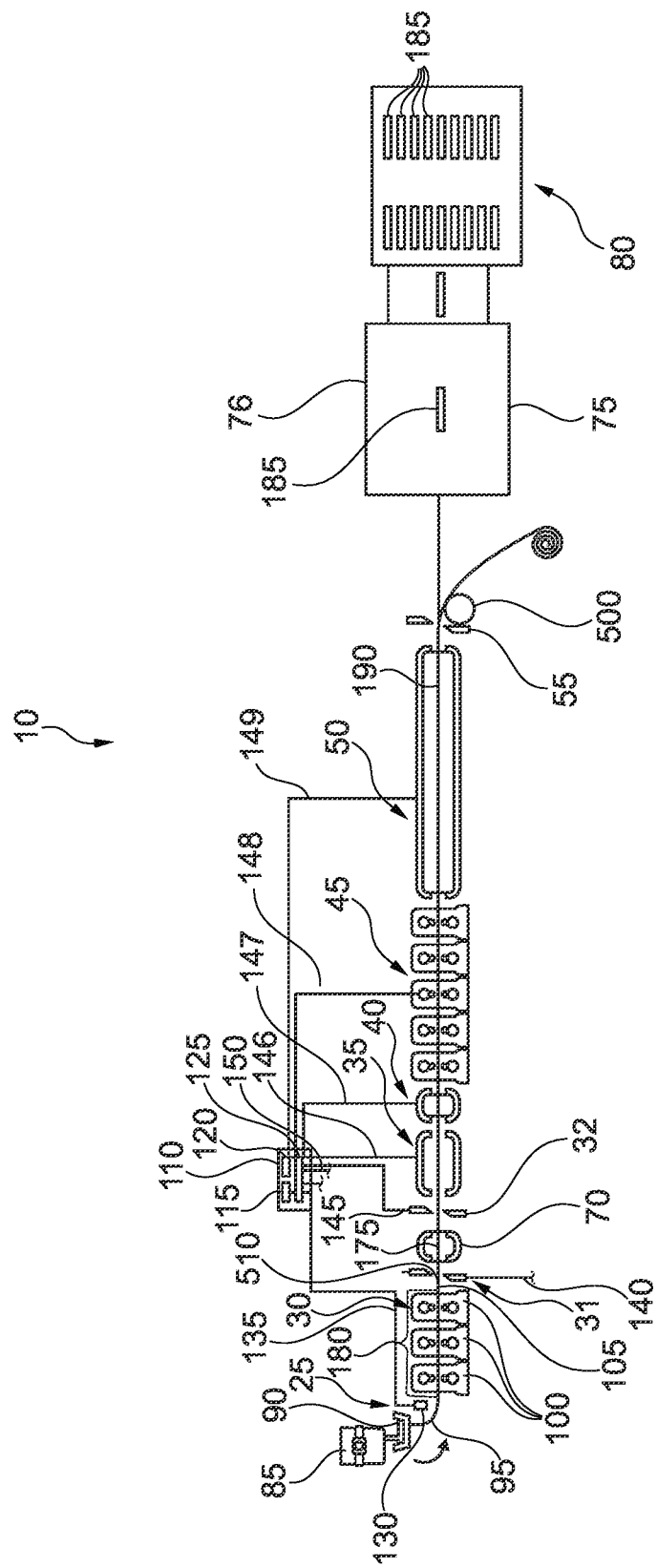

FIG. 10 shows a schematic illustration of a combined casting and rolling installation 10 according to a fourth embodiment.

The combined casting and rolling installation 10 is configured to be substantially identical to the combined casting and rolling installation 10 shown in FIG. 9. Only the differences between the combined casting and rolling installation 10 according to the fourth embodiment shown in FIG. 10 and the third embodiment shown in FIG. 9 are discussed below.

By contrast to FIG. 9, a deflection device 500 is arranged on the outlet side of the second severing device 55. The deflection device 500 adjoins the discharging device 76 in a straight line of the conveying direction of the finish-rolled strip 190 in the cooling device. The winding device 60 is arranged offset with respect to the straight line of the conveying direction of the finish-rolled strip 190 in the cooling device 50.

The combined casting and rolling installation 10 shown in FIG. 10 may be operated substantially by the method described in FIG. 9. The refinement shown in FIG. 10 has the advantage that the rough-rolled strip piece 185 can be transported in a rectilinear manner, and the easily deflectable finish-rolled strip 190 can be deflected by the deflection device 500, which comprises for example a deflection roll, to the winding device 60 in the thirteenth method step 265.

Figure 11:
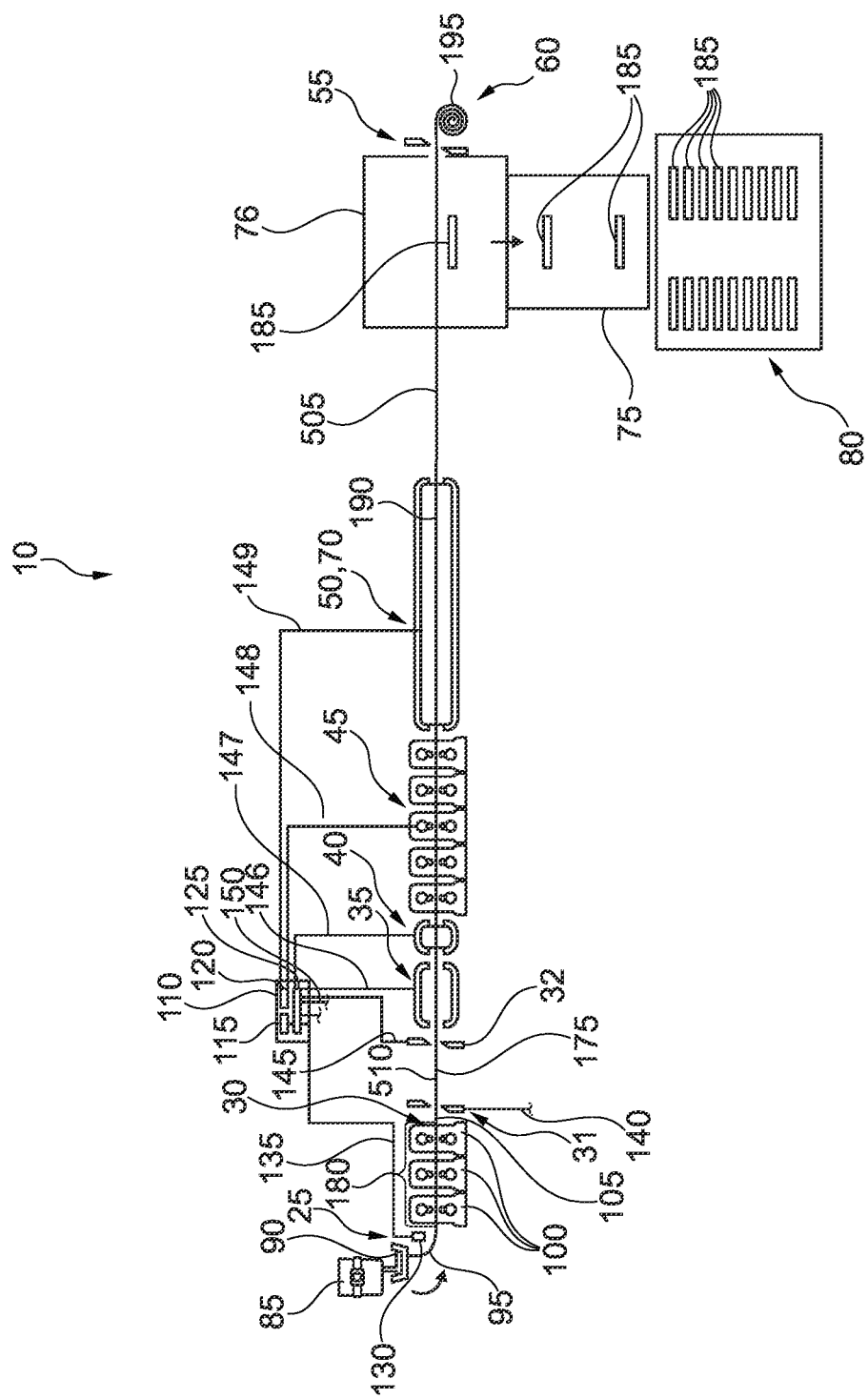

FIG. 11 shows a schematic illustration of a combined casting and rolling installation 10 according to a fifth embodiment.

The combined casting and rolling installation 10 is configured to be substantially identical to the combined casting and rolling installation 10 shown in FIG. 9. Only the differences between the combined casting and rolling installation 10 according to the fifth embodiment shown in FIG. 11 and the third embodiment shown in FIG. 9 are discussed below.

The quenching device 70 and the cooling device 50 are of integrated configuration. On the output side of the cooling device 50, a third transporting device 505 connects the discharging device 76 to the cooling device 50. A roller table 510 is arranged between the first severing device 31 and the second severing device 32 in order to transport the rough-rolled strip 105 or the rough-rolled strip piece 185 between the first severing device 31 and the second severing device 32. The roller table 510 is part of the first transporting device 65.

The combined casting and rolling installation 10 shown in FIG. 11 may be operated substantially by the method described in FIG. 9. Only the differences between the method for operating the combined casting and rolling installation 10 shown in FIG. 11 and the method described in FIG. 9 are discussed below.

In the sixth method step 230, the control device 115 may deactivate the descaler 40. It is also possible for the descaler 40 to be activated. The intermediate heating system 35 may be activated or deactivated by the control device 115. The control device 115 also switches the finishing rolling mill train 45 to the first operating state.

In the sixth method step 230, the roller table 510 transports the rough-rolled strip piece 185 from the first severing device 31 to the second severing device 32 and into the intermediate heating system 35. From the intermediate heating system 35, the hot rough-rolled strip piece 185 is transported through the descaler 40 into the finishing rolling mill train 45, which, for its part, transports the rough-rolled strip piece into the integrated cooling and quenching device 50, 70.

In the seventh to ninth method steps 235, 240, 245, the cooling and quenching device 50, 70 which is of elongate form in the conveying direction of the finish-rolled strip 190 makes it possible for the rough-rolled strip piece 185 to remain in the integrated cooling and quenching device 50, 70, wherein, in the eighth method step 240, the control device 120 deactivates the cooling and quenching device 50, 70 and the rough-rolled strip piece 185 undergoes no cooling by cooling liquid. As a result, the recovery and heat treatment process is carried out in the cooling and quenching device 50, 70.

The embodiment shown in FIG. 11 has the advantage that the combined casting and rolling installation 10 is configured in a particularly simple and cost-effective manner, and the additional installation space requirement is kept low.

In addition, with regard to the embodiment of the combined casting and rolling installation 10 shown in FIGS. 1 and 7 to 11, a tempering section may also be provided between the quenching device 70 and the second transporting device 75, in order to temper the rough-rolled strip piece 185 again after the rough-rolled strip piece 185 has been quenched.

The combined casting and rolling installation 10 shown in the figures, and the method for operating the combined casting and rolling installation 10, ensures that the rough-rolled strip piece 185 does not need to be scrapped, but rather can be further processed by way of the quenching to form, for example, wear-resistant plates.

LIST OF REFERENCE DESIGNATIONS

10 Combined casting and rolling installation
25 Continuous casting installation
30 Rough-rolling mill train
31 First severing device
32 Second severing device
35 Intermediate heating system
40 Descaler
45 Finishing rolling mill train
50 Cooling device
55 Third severing device
60 Winding device
65 First transporting device
70 Quenching device
75 Second transporting device
76 Separating-out device
80 Rough-rolled strip piece storage unit
85 Ladle
90 Metallic melt
95 Hot billet
100 Rough-rolling stand
105 Rough-rolled strip
110 Control unit
115 Control device
120 Data memory
125 Interface
130 Sensor
135 First data connection
140 Second data connection
145 Third data connection
150 Fourth data connection
155 Finishing rolling stand
160 Quenching tank
165 Cooling liquid
170 Lifting device
175 First sub-portion
180 Second sub-portion
185 Rough-rolled strip piece
190 Finish-rolled strip
191 Core
193 Center
192 Outer layer
195 Coil
200 Quenching stand
205 First method step
210 Second method step
215 Third method step
220 Fourth method step
225 Fifth method step
230 Sixth method step
235 Seventh method step
240 Eighth method step
245 Ninth method step
250 Tenth method step
255 Eleventh method step
260 Twelfth method step
265 Thirteenth method step
270 Fourteenth method step
305 First graph
306 Second graph
307 Third graph
308 Fourth graph
309 Fifth graph 310 Sixth graph
311 Seventh graph
312 Eighth graph
313 Ninth graph
314 Tenth graph
405 Ferrite
410 Martensite
415 Pearlite
420 Bainite
500 Deflection device
505 Third transporting device
510 Roller table
ti i-th time interval

The invention claimed is:

1. A combined casting and rolling installation for producing a hot-rolled product from a continuously cast hot billet, comprising:
a rough-rolling mill train configured to roll a continuously cast hot billet to form a rough-rolled strip;
a discharging device arranged downstream of the rough-rolling mill train with respect to a conveying direction of the rough-rolled strip of the rough-rolling mill train;
a first transporting device;
a quenching device;
a severing device arranged between the rough-rolling mill train and the discharging device, the severing device being configured to cut up a first sub-portion of the rough-rolled strip into a rough-rolled strip piece; and
a control device configured to assign a local casting rate of the continuously cast hot billet to a rough-rolled strip position of the rough-rolled strip, the control device configured to identify the first sub-portion of the rough-rolled strip based on the rough-rolled strip position and the local casting rate;
wherein the discharging device is configured to discharge the rough-rolled strip piece, wherein the first transporting device connects the severing device to the quenching device and is configured to transport the rough-rolled strip piece to the quenching device;
wherein the quenching device is configured to quench the rough-rolled strip piece;
wherein the rough-rolled strip piece is transported from the quenching device to a rough-rolled strip piece storage unit;
wherein the discharging device is configured to discharge the rough-rolled strip piece to the rough-rolled strip piece storage unit; and
wherein the local casting rate assigned by the control device to identify the first sub-portion of the rough-rolled strip is below a predefined minimum casting rate, the predefined minimum casting rate being a minimum for rolling the rough-rolled strip in a finishing rolling mill train.

2. The combined casting and rolling installation as claimed in claim 1, wherein:
the quenching device comprises a quenching tank and a lifting device;
the quenching tank can be filled with a cooling liquid; and
the lifting device adjoins the first transporting device in a conveying direction of the rough-rolled strip piece and is configured to lower the rough-rolled strip piece into the quenching tank for quenching of the rough-rolled strip piece for a predefined first time interval (t1) and to lift said rough-rolled strip piece out of the quenching tank after the first time interval (t1) has expired.

3. The combined casting and rolling installation as claimed in claim 2, wherein the cooling liquid is a cooling water.

4. The combined casting and rolling installation as claimed in claim 2, wherein:
the lifting device is configured to hold the rough-rolled strip piece outside of the cooling liquid for a predefined second time interval (t2); and
the lifting device is configured to lower the rough-rolled strip piece into the quenching tank again for a third time interval (t3) after the second time interval (t2) has expired and to lift said rough-rolled strip piece out of the quenching tank again after the third time interval (t3) has expired.

5. The combined casting and rolling installation as claimed in claim 1, wherein:
the quenching device comprises at least one quenching unit;
the rough-rolled strip piece can be transported through the quenching unit at a predefined rate (v); and
the quenching unit is configured to spray a cooling liquid in a directed manner onto the rough-rolled strip piece for quenching of the rough-rolled strip piece.

6. The combined casting and rolling installation as claimed in claim 5, wherein the cooling liquid is at least one of water and liquid nitrogen.

7. The combined casting and rolling installation as claimed in claim 1, comprising:
the rough-rolled strip piece storage unit and a second transporting device;
wherein the second transporting device is arranged at least between the rough-rolled strip piece storage unit and the quenching device;
wherein the second transporting device is configured to transport the rough-rolled strip piece from the quenching device to the rough-rolled strip piece storage unit; and
wherein the rough-rolled strip piece storage unit is configured to store the rough-rolled strip piece for at least 12 hours.

8. The combined casting and rolling installation as claimed in claim 7, wherein the rough-rolled strip piece storage unit is configured to store the rough-rolled strip piece for at least 24 hours.

9. The combined casting and rolling installation as claimed in claim 1, comprising:
a finishing rolling mill train;
wherein the finishing rolling mill train is arranged downstream of the discharging device with respect to the conveying direction of the rough-rolled strip;
wherein the finishing rolling mill train is arranged parallel to the quenching device;
wherein a second sub-portion of the rough-rolled strip can be supplied to the finishing rolling mill train;
wherein the finishing rolling mill train is configured to roll the second sub-portion into a finish-rolled strip;
wherein the discharging device is configured to transfer the rough-rolled strip piece to the first transporting device; and
wherein the first transporting device is configured to transport the rough-rolled strip piece to the quenching device.

10. The combined casting and rolling installation as claimed in claim 1, comprising:
a finishing rolling mill train;

wherein the finishing rolling mill train is arranged downstream of the rough-rolling mill train with respect to the conveying direction of the rough-rolled strip;

wherein a second sub-portion of the rough-rolled strip can be supplied to the finishing rolling mill train;

wherein the finishing rolling mill train has a first operating state and a second operating state which differs from the first operating state;

wherein the discharging device is arranged downstream of the finishing rolling mill train with respect to the conveying direction of the rough-rolled strip;

wherein the finishing rolling mill train is part of the first transporting device and is configured, in the first operating state, to transport the rough-rolled strip piece to the discharging device;

wherein the discharging device is configured to discharge the rough-rolled strip piece; and wherein the finishing rolling mill train is configured, in the second operating state, to roll the second sub-portion into a finish-rolled strip.

11. The combined casting and rolling installation as claimed in claim 10, wherein:
the quenching device is arranged between the rough-rolling mill train and the finishing rolling mill train with respect to the conveying direction of the rough-rolled strip; and
in the first operating state, the finishing rolling mill train is configured to transport the quenched rough-rolled strip piece to the discharging device.

12. The combined casting and rolling installation as claimed in claim 10, wherein:
the quenching device is between the finishing rolling mill train and the discharging device with respect to the conveying direction of the finish-rolled strip;
the severing device is arranged between the rough-rolling mill train and the finishing rolling mill train; and
in the first operating state, the finishing rolling mill train is configured to maintain a cross section of the rough-rolled strip piece.

13. The combined casting and rolling installation as claimed in claim 1, wherein the first transporting device begins at the discharging device.

14. The combined casting and rolling installation as claimed in claim 1, wherein the first transporting device ends at the quenching device.

15. The combined casting and rolling installation as claimed in claim 1, wherein the first transporting device comprises a first roller table.

16. A method for operating a combined casting and rolling installation for producing a hot-rolled product from a continuously cast hot billet, comprising:
providing a the combined casting and rolling installation including:
a rough-rolling mill train configured to roll a continuously cast hot billet to form a rough-rolled strip;
a discharging device arranged downstream of the rough-rolling mill train with respect to a conveying direction of the rough-rolled strip of the rough-rolling mill train;
a first transporting device;
a quenching device;
a severing device arranged between the rough-rolling mill train and the discharging device, the severing device being configured to cut up a first sub-portion of the rough-rolled strip into a rough-rolled strip piece; and a control device configured to assign a local casting rate of the continuously cast hot billet to a rough-rolled strip position of the rough-rolled strip, the control device configured to identify the first sub-portion of the rough-rolled strip based on the rough-rolled strip position and the local casting rate;

wherein the discharging device is configured to discharge the rough-rolled strip piece, wherein the first transporting device connects the severing device to the quenching device and is configured to transport the rough-rolled strip piece to the quenching device;

wherein the quenching device is configured to quench the rough-rolled strip piece;

wherein the rough-rolled strip piece is transported from the quenching device to a rough-rolled strip piece storage unit;

wherein the discharging device is configured to discharge the rough-rolled strip piece to the rough-rolled strip piece storage unit; and wherein the local casting rate assigned by the control device to identify the first sub-portion of the rough-rolled strip is below a predefined minimum casting rate, the predefined minimum casting rate being a minimum for rolling the rough-rolled strip in a finishing rolling mill train;

the method further comprising:
rolling the continuously cast hot billet in the rough-rolling mill train to form the rough-rolled strip;
cutting, by the severing device, the first sub-portion of the rough-rolled strip into rolled the rough-rolled strip piece;
discharging, by the discharging device, the rough-rolled strip piece;
transporting, by the first transporting device, the rough-rolled strip piece from the severing device to the quenching device; and
quenching, by the quenching device, the rough-rolled strip piece by a cooling liquid.

17. The method as claimed in claim 16, wherein:
the rough-rolled strip piece is exposed to the cooling liquid for a predefined first time interval (t1), and an outer layer of the rough-rolled strip piece is quenched during the first time interval (t1);
after the rough-rolled strip piece has been quenched, the rough-rolled strip piece is stored for a second predefined time interval (t2) and a core heats the quenched outer layer again; and
after the second time interval (t2) has expired, the rough-rolled strip piece is again exposed to the cooling liquid for a third predefined time interval (t3) and quenched.

18. The method as claimed in claim 17, wherein:
during the first time interval (t1), the outer layer of the rough-rolled strip piece is quenched from a first temperature of between 1050° C. and 1200° C. to a second temperature of 150° C. to 400° C.;
the core of the rough-rolled strip piece heats the outer layer in the second time interval (t2) to a third temperature of between 400° C. and 600° C.; and
in the third time interval (t3), the outer layer is quenched to a fourth temperature of between 100° C. and 200° C.

19. The method as claimed in claim 16, wherein:
a local casting rate is ascertained over an operation of casting the hot billet from a metallic melt;
the local casting rate is assigned to a rough-rolled strip position of the rough-rolled strip; and the first sub-portion of the rough-rolled strip with a local casting rate below a predefined minimum casting rate is ascertained.

20. The method as claimed in claim 19, wherein:

a second sub-portion of the rough-rolled strip with a local casting rate (v) above the predefined minimum casting rate is ascertained;

the second sub-portion is supplied to a finishing rolling mill train; and the finishing rolling mill train is configured to finish-roll the second sub-portion to form the finish-rolled strip.

* * * * *